US009307354B2

(12) United States Patent
Dal Santo et al.

(10) Patent No.: US 9,307,354 B2
(45) Date of Patent: Apr. 5, 2016

(54) RETROACTIVE CHECK-INS BASED ON LEARNED LOCATIONS TO WHICH THE USER HAS TRAVELED

(71) Applicant: APPLE INC., Cupertino, CA (US)

(72) Inventors: Michael P. Dal Santo, San Francisco, CA (US); Lukas M. Marti, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/207,132

(22) Filed: Mar. 12, 2014

(65) Prior Publication Data

US 2015/0264518 A1 Sep. 17, 2015

(51) Int. Cl.
*H04W 24/00* (2009.01)
*H04W 4/02* (2009.01)
*H04W 64/00* (2009.01)
*G06Q 30/02* (2012.01)

(52) U.S. Cl.
CPC ............ *H04W 4/02* (2013.01); *H04W 64/00* (2013.01); *G06Q 30/0261* (2013.01)

(58) Field of Classification Search
CPC .............. H04W 4/02; H04W 64/00; H04L 29/086578; G06Q 30/0261
USPC .............. 455/457, 456.5, 456.6; 705/14.58
See application file for complete search history.

(56) References Cited

U.S. PATENT DOCUMENTS

| 8,316,237 | B1* | 11/2012 | Felsher et al. | 713/171 |
|---|---|---|---|---|
| 8,521,180 | B2 | 8/2013 | Parish | |
| 2008/0045234 | A1* | 2/2008 | Reed | 455/456.1 |
| 2012/0047102 | A1 | 2/2012 | Petersen et al. | |
| 2012/0233158 | A1 | 9/2012 | Braginsky et al. | |
| 2013/0066986 | A1 | 3/2013 | Dicosola | |
| 2013/0073388 | A1* | 3/2013 | Heath | 705/14.53 |
| 2014/0248852 | A1* | 9/2014 | Raleigh et al. | 455/407 |
| 2014/0379476 | A1* | 12/2014 | Palfreyman et al. | 705/14.58 |

OTHER PUBLICATIONS

Malmi, et al., "Checking In or Checked In: Comparing Large-Scale Manual and Automatic Location Disclosure Patterns," Mobile and Ubiquitous Multimedia, ACM, Dec. 2012, 10 pages.

* cited by examiner

*Primary Examiner* — Danh Le
(74) *Attorney, Agent, or Firm* — Kilpatrick Townsend & Stockton LLP

(57) ABSTRACT

A mobile device enables its user to retroactively "check in," on social media, to locations to which the device has previously been. The mobile device automatically tracks the locations to which it goes during some time interval. As the mobile device goes to each location, the mobile device stores data that specifies that location. Following the time interval, and potentially in response to a request by the device's user to view the locations previously visited, the mobile device presents a list of at least some of the locations on its display. The device's user can select one or more of the presented locations. The selection of a location causes the mobile device to post, to an Internet-based social media service, information pertaining to the selected location. For example, such information can indicate that the device's user had been at the selected location.

22 Claims, 5 Drawing Sheets

RETROACTIVE CHECK-INS BASED ON LEARNED LOCATIONS TO WHICH THE USER HAS TRAVELED

BACKGROUND

Embodiments of the invention pertain generally to the field of social media, and more specifically to the use of global positioning system coordinates to share locations through social media.

Social media applications, or sites, allow a user to share his status with a selected circle of friends. When the user submits a new status, that status can be posted to the user's profile for viewing by his friends. Along with text that the user submits as the topic of the status, the social media application can also publish auxiliary information about that status, such as the time at which the status was submitted and the place from which the status was submitted. The place can be determined through a variety of different techniques. For example, the social media application can ask the user to specify a location at which the user is currently located at the time that the status is posted. For another example, the social media application can consult a global positioning system of a mobile device—such as a smart phone—through which the status is being submitted, in order to determine the current location of the mobile device at that particular moment. Popular examples of social media applications include Facebook and Twitter. Typically, these social media applications maintain a separate profile for each user of that application, and publish status updates to each user's profile as that user provides such status updates. Each user's profile is typically accessible by other users of the social media application through a web browsing application over the Internet. Such a profile is sometimes called a "page" or a "wall."

Often, a social media application user will share his status without any associated location at all. However, at other times, a user might want his friends to know where he is at a particular moment. The user might want his friends to have this information so that they can find and meet with him if they are capable and desirous. Alternatively, the user might want his friends to have this information so that they can learn more about the kinds of places that the user enjoys frequenting. By providing a location to a social media application, a user can essentially recommend (for or against) a visit to the same place by the people who read his social media profile.

One facility that social media applications can provide to enable a user to share his current location specifically is called a "check-in." A social media application can provide, within a user interface, a user interface element that the user can select in order to check-in. In response to the user selecting this particular user interface element, the social media application can obtain the user's current location as of the moment of the selection using any of the techniques discussed above (e.g., manual specification, automatic GPS determination, etc.). The social media application can then publish that current location to the user's profile, potentially without any other associated status text. In this manner, the user can quickly report his whereabouts to his friends.

Although checking in provides a quick way for the user to publish his current location at any desired moment, a user who is engrossed in his current activities might not remember to check in. Constantly checking in to places as the user visits them requires some diligence on the user's part. The user might prefer to "live in the moment" of his activities instead of interacting with his mobile device each time that he visits a new location of interest; such constant interaction with a mobile device can prove to be a significant (and potentially rude) distraction. The user might be so interested in the events occurring at the places to which he goes that he might completely forget to check in at any of them. After a very busy day of travel, such as might occur when the user is on vacation, the user might wish that he could recall all of his daily adventures, so that he could share those adventures with his friends on social media. Unfortunately, after the fact, the user might not be able to recall all of the locations that he visited during the day. Indeed, the user might have only had a vague notion of the general areas in which he had been. After the user has left all of the places that he has been, it can be too late for the user to check in to any of those places on social media.

BRIEF SUMMARY

Techniques disclosed herein provide a convenient way for a user to check in retroactively to places to which the user has been but from which he has already departed. Using these techniques, a user can check in retroactively to previously visited places even after the user has left those places. Unlike conventional check-in functionality, the user does not need to be at a place currently in order to check in to that place.

In one embodiment of the invention, a mobile device can and constantly records its current location. The mobile device can determine its current location without any direction from its user. The mobile device can use a variety of mechanisms to determine its location automatically; for example, the mobile device can use coordinates received by the device's GPS, or coordinates estimated based on WiFi signals, or coordinates estimated based on cellular telephone signals. The user of the mobile device does not need to be aware of, or notified that, the mobile device is storing the locations to which the device travels as the device stores those locations.

At some later time of the user's choosing—potentially long after the user has departed from all of the locations on the list—the user can instruct the mobile device to present a list of the locations that it has stored. The user can select some or all of these locations. In response to this selection, the mobile device can then retroactively check-in the user to each of the selected locations on one or more social media sites on which the user has a profile (e.g., Facebook, Twitter, etc.). For each selected location, the mobile device can automatically generate, on the user's social media profile, a posting that specifies the location, a time and date on which the user visited the location, and/or other information about that location.

In one embodiment of the invention, the mobile device automatically learns, over time, specific geographical sites that correspond to places to which the device has traveled. The mobile device can use this geographical site determination to enhance or refine the presentation of the list of locations and/or the details that the device publishes about locations that the user retroactively selects from that list. Thus, instead of presenting a lengthy list of numerical coordinates whose meaning might be difficult to determine, the mobile device can attempt to group sets of coordinates together under a representative site label under circumstances in which multiple coordinates are likely to correspond to a specific geographical site—such as the user's home, school, or workplace, for example.

Thus, techniques disclosed herein unobtrusively preserve a record of where a mobile device's user has traveled, and provide a convenient way for the user to share desired portions of that record with his friends on social media, without distracting the user from his activities during his travels.

DETAILED DESCRIPTION

A mobile device enables its user to retroactively "check in," on social media, to locations to which the device has previously been. The mobile device automatically tracks the locations to which it goes during some time interval. As the mobile device goes to each location, the mobile device stores data that specifies that location. Following the time interval, and potentially in response to a request by the device's user to view the locations previously visited, the mobile device presents a list of at least some of the locations on its display. The device's user can select one or more of the presented locations. The selection of a location causes the mobile device to post, to an Internet-based social media service, information pertaining to the selected location. For example, such information can indicate that the device's user had been at the selected location.

I. Determining Visited Geographical Sites

Figure 1:
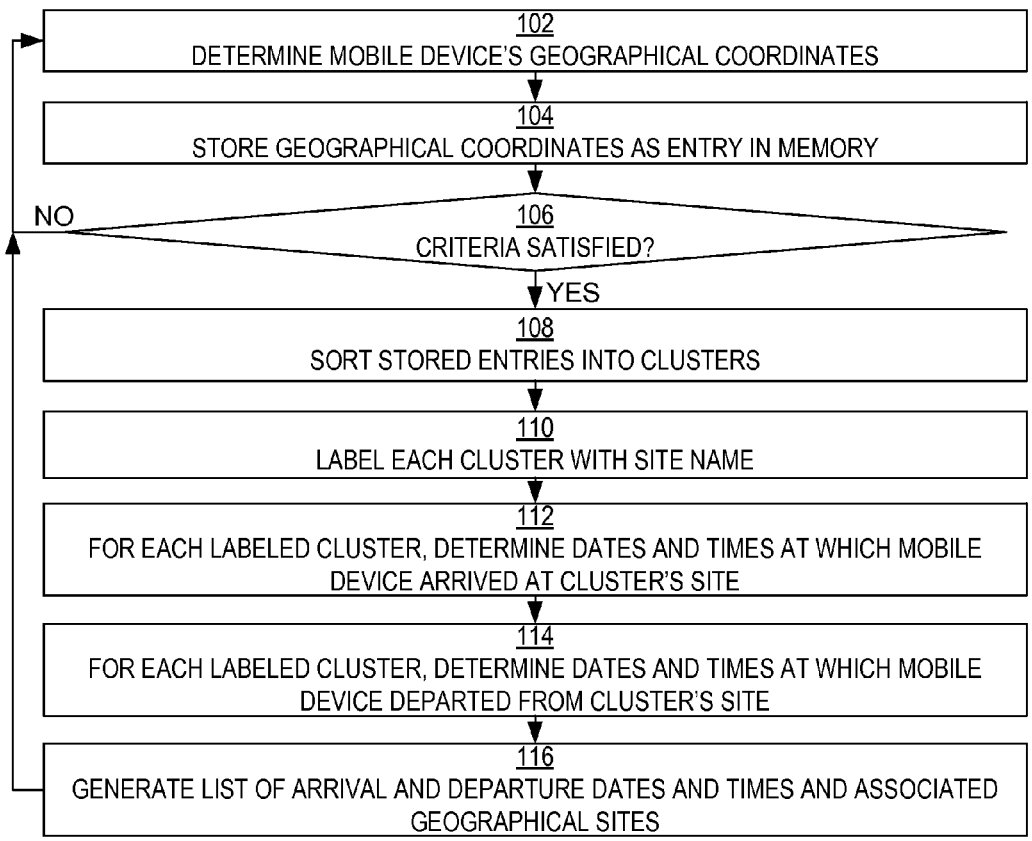
FIG. 1 is a flow diagram that illustrates a technique by which a mobile device can automatically determine geographical sites to which the mobile device has been, according to an embodiment of the invention.

FIG. 1 is a flow diagram that illustrates a technique by which a mobile device can automatically determine geographical sites to which the mobile device has been, according to an embodiment of the invention. As used herein, geographical sites refer to physical places to which a person can travel, whereas, in contrast, social media sites refer to informational entities existing in a computer network such as the Internet.

In block 102, the mobile device automatically determines its geographical coordinates. For example, the mobile device can determine its geographical coordinates using GPS. Other techniques for determining a mobile device's geographical coordinates are disclosed in U.S. Pat. No. 8,494,554, which is incorporated by reference herein.

In block 104, the mobile device stores the geographical coordinates in memory. For example, the mobile device can store, in its memory, an entry that specifies: the geographical coordinates, a date on which the entry was generated, and a time at which the entry was generated.

In block 106, the mobile device determines whether specified criteria are satisfied. For example, in one embodiment, the mobile device can determine whether at least a specified amount of time has passed since the mobile device last analyzed the stored entries. For another example, in one embodiment, the mobile device can determine whether at least a specified quantity of additional entries have been stored since the mobile device last analyzed the stored entries. For yet another example, in one embodiment, the mobile device can determine whether a user of the mobile device has instructed the mobile device to present a list of locations that the mobile device previously visited. If the criteria are satisfied, then control passes to block 108. Otherwise, control passes back to block 102. In the above manner, the mobile device automatically maintains a travel log. In an embodiment, this travel log is maintained exclusively within the memory of the mobile device and is not shared with any other device.

In block 108, the mobile device sorts the entries stored in memory into clusters. The mobile device can use any kind of clustering technique in order to place the stored entries into clusters. Some entries might not belong to any cluster.

In block 110, the mobile device labels each cluster of locations. For example, the mobile device can compare the entries' coordinates within the cluster to named locations on a digital map also stored in the mobile device's memory. If a particular cluster is well correlated with a particular named location on the digital map, then the device can assign the name of that location to that particular cluster. For example, if all of the entries' coordinates in a particular cluster are within some specified distance of a particular named location, then the mobile device can determine that the particular cluster is well-correlated with that named location. In one embodiment, the named location can be a street address that is closest to a center of the particular cluster.

In block 112, for each labeled cluster, the mobile device determines one or more dates and times at which the mobile device arrived at the named location for that cluster.

In block 114, for each labeled cluster, the mobile device determines one or more dates and times at which the mobile device departed from the named location for that cluster.

As an example, in order to make the determinations of blocks 112 and 114, the mobile device can sort the stored entries for that cluster in temporal order, from earliest to latest. The mobile device can group the sorted entries based on how temporally close they are to each other. Temporally consecutive entries that are separated by relatively lengthy intervals of time compared to the relatively shorted intervals of time that separate other temporally consecutive entries can be deemed to belong to different temporal groups, for example. For each temporal group, the mobile device can set an entry date and time for that group to the earliest date and time of any entry in that temporal group, and the mobile device can set a departure date and time for that group to the latest date and time of any entry in that temporal group. If the mobile device has visited a particular geographical site on separate occasions, even briefly each time, then that geographical site is likely to be associated with multiple such temporal groups. Conversely, if the mobile device has visited a particular geographical site just once, then that geographical site is likely to be associated with only one such temporal group, regardless of how lengthy that sole visit was.

In block 116, the mobile device generates a list of arrival and departure dates and times and associated geographical sites based on the determinations of blocks 112 and 114. The mobile device can store this list in its memory. Over time, with additional accumulated data, that mobile device can modify and refine this list. Such modification and refinement can cause some information to be removed from the list and other information to be added to the list. Control passes back to block 102.

At any moment that a user of the mobile device desires, or at a scheduled time, the mobile device can use the list generated in block 116 in order to enable that user to cause the mobile device to retroactively check in, on the user's social media profile, to one or more of the geographical sites represented in the list. Techniques for using such an automatically generated list to retroactively check-in to social media sites are discussed in further detail below.

II. Retroactive Check-Ins

Figure 2:
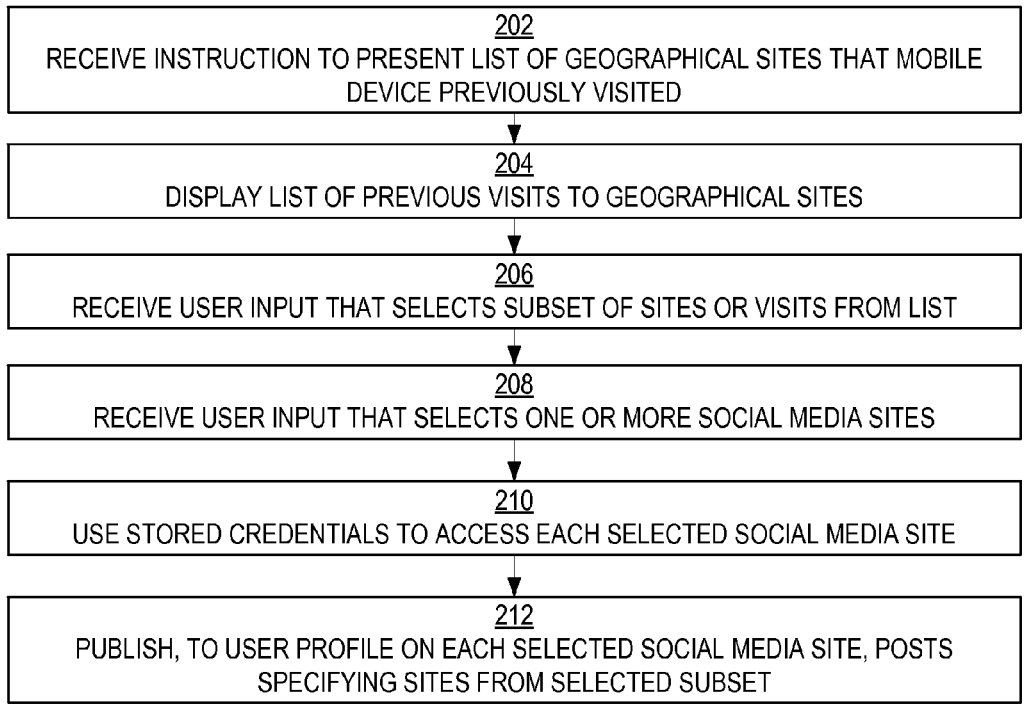
FIG. 2 is a flow diagram that illustrates a technique by which a mobile device can publish, on a user's profile within selected social media sites, posts that indicate places to which the user has previously been and the dates and times at which the user visited those places, according to an embodiment of the invention.

FIG. 2 is a flow diagram that illustrates a technique by which a mobile device can publish, on a user's profile within selected social media sites, posts that indicate places to which the user has previously been and the dates and times at which the user visited those places, according to an embodiment of the invention. Notably, in one embodiment of the invention, at least some of the places for which the mobile device publishes posts are places at which the mobile device previously was located but is not located at the time of the posting. Multiple different device-visited places, each with a different associated geographical label (as discussed above) can temporally intervene between any particular post and the mobile device's current location at the moment that the mobile device publishes that particular post to a social media profile. Also notably, in one embodiment of the invention, at least some of the places for which the mobile device generates and publishes such posts are not places that were manually specified by the mobile device's user or any other human being. Instead, at least some of these places are automatically selected by the mobile device based on geographical coordinates that the mobile device previously recorded while at those places, prior to departing from those places to other places.

In block 202, a mobile device receives an instruction to present a list of geographical sites that the mobile device previously visited. For example, the mobile device can detect user interaction (e.g., via a touch-sensitive display of the mobile device) with a user interface element that is associated with a retroactive check-in feature. Such a user interface element might be associated with an application, executing on the mobile device, that is not exclusively associated with any single social media application, domain, or site.

In block 204, in response to the receipt of the instruction in block 204, the mobile device displays a list of geographical sites that the mobile device previously visited. For example, the mobile device can display, to its user, a list that the mobile device generated using the technique discussed above in connection with FIG. 1. In one embodiment, the list can include geographical sites that the mobile device has not yet ever previously presented to or received from its user. The list can include place names that the mobile device automatically determined and associated with clusters of coordinates. Such place names can be street addresses, for example.

In one embodiment, the mobile device automatically labels or names certain known geographical sites based on identifying data that is maintained for various applications executable by the mobile device. For example, the mobile device can maintain data indicating the home address and employment address of the mobile device's owner and user. Under such circumstances, if the home address or employment address are among the previously visited geographical sites in the list, the mobile device can automatically label or name those sites "home" or "work," respectively. The mobile device may glean the names of other geographical sites from data stored in association with a "contacts" application resident on the mobile device, for example.

The list can include places for which the mobile device could not determine any place name automatically. In one embodiment of the invention, such places can simply be labeled generically with some automatically generated alphanumeric identifier that distinguishes them from other places on the list. In one embodiment of the invention, the mobile device can receive user input that modifies the names of one or more places in the list. Such user input can be in the form of typed text or in the form of a selection from a device-suggested list of potential points of interest that are in the vicinity of known geographical coordinates of the places in the list. In the case of a list of potential points of interest, the mobile device can suggest, more prominently, points of interest to which the user has previously checked in on one or more social media sites. In such an embodiment, the mobile device can persistently store such modified names so that those names are automatically associated with those places in the future. In one embodiment, for each geographical site in the list, the mobile device displays, proximate to that geographical site, a date and time at which the mobile device arrived at that site, and/or a date and time at which the mobile device departed from that site. In one implementation, the list is not just a list of geographical sites, but more specifically a list of distinct previous visits; in such a list, a particular geographical site may be listed multiple times, representing distinct prior visits on separate occasions to that particular geographical site.

In block 206, the mobile device receives user input that selects at least a subset of the geographical sites, or previous visits, displayed in the list. For example, the mobile device can detect that the user has activated checkbox user interface controls shown next to some of the sites or visits in the list.

In block 208, the mobile device receives user input that selects one or more social media sites from a set of social media sites. For example, the set can include social media sites such as Facebook, Twitter, Google Plus, MySpace, Pinterest, and/or other social media sites. In one embodiment, the mobile device maintains stored data that specifies the user's login credentials (i.e., name and password) for each social media site on which the user maintains a profile. For any user-selected social media site for which the mobile device does not yet possess the user's login credentials, the mobile device can request such login credentials for those social media sites at that time. The mobile device can persistently store such login credentials for future use.

In block 210, the mobile device uses the user's login credentials for each selected social media site to access the user's profile on that selected social media site. For example, the mobile device can automatically log-in to each selected social media site by submitting, to a log-in interface provided by that site, a username and password that the mobile device previously stored for that social media site. The mobile device can submit a different and appropriate set of login credentials to each separate social media site in order to gain access to the user's profiles on those sites.

In block 212, for each particular social media site selected in block 208, and for each particular geographical site in the subset selected in block 206, the mobile device publishes, on the user's profile on that particular social media site, a post that specifies at least the place name that is associated with that particular geographical site. In one embodiment, each such post can specify further information, such as the date and/or time at which the mobile device arrived at the particular geographical site and/or the date and/or time at which the mobile device departed from the particular geographical site.

In one embodiment, each such post can further specify a date and/or time at which the post was published, which, as is discussed above, varies from the date and/or time at which the prior visit to which the post pertains occurred. The mobile device can publish multiple such posts on the user's profiles on each of the selected social media sites. Thereafter, designated social media friends of the user are able to view the posts automatically published on those profiles in this manner.

In one embodiment, after publishing, on one or more social media profiles, a post that refers to a previous visit to a particular geographical location, the mobile device marks in its memory the entries that pertain to that previous visit. In this manner, the mobile device is able to distinguish visually, in its lists, previous visits for which posts have already been published from previous visits for which posts have not yet been published.

Figure 4:
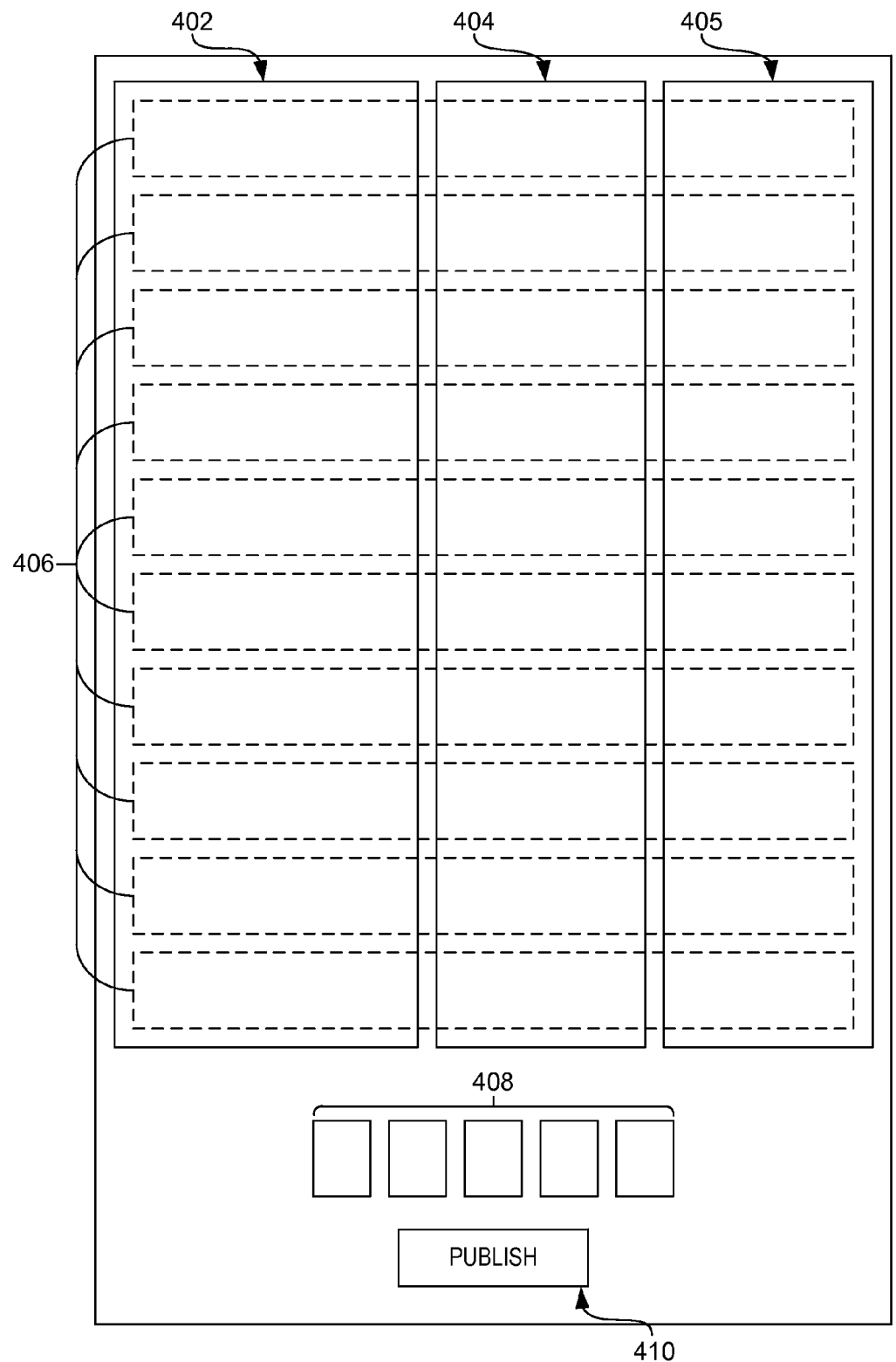
FIG. 4 is a diagram illustrating an example of a mobile device user interface showing multiple places to which the mobile device has previously been, according to an embodiment of the invention.

FIG. 4 is a diagram illustrating an example of a mobile device user interface showing multiple places to which the mobile device has previously been, according to an embodiment of the invention. The user interface includes a column 402 that specifies geographical sites, a column 404 that specifies arrival dates and times at which the mobile device arrived at those sites, and a column 405 that specifies departure dates and times at which the mobile device departed from those sites. The user interface also includes entries 406, each of which specifies a separate geographical site and the arrival and departure dates and times at which the mobile device arrived at and departed from that site. The user interface further shows a set of social media site icons 408, each of which represents a different social media site to which the user can retroactively check in.

In one embodiment, a mobile device can receive user input selecting a subset of entries 406 and a subset of social media site icons 408. For example, a mobile device may receive such user input via the device's user touching various locations on a touch-sensitive display of the mobile device. The mobile device can highlight the interface items so touched in order to express the current selection of those interface items. The user interface also includes a "publish" user interface control 410 that the mobile device's user can activate in order to cause the mobile device to check in, retroactively, to each of the geographical site(s) selected from entries 406, on the user's profile(s) at each of the social media site(s) selected from icons 408.

In one embodiment of the invention, using the travel log that a mobile device automatically maintains, the mobile device can publish, to social media profiles, content beyond just the information that identifies a geographical site and a date and time of a prior visit to that site. Such content can include photographs or other images, for example, that pertain to the places that the mobile device previously visited. Techniques for publishing such other content are discussed in further detail below.

III. Automatically Associating Media with Previously Visited Places

Figure 3:
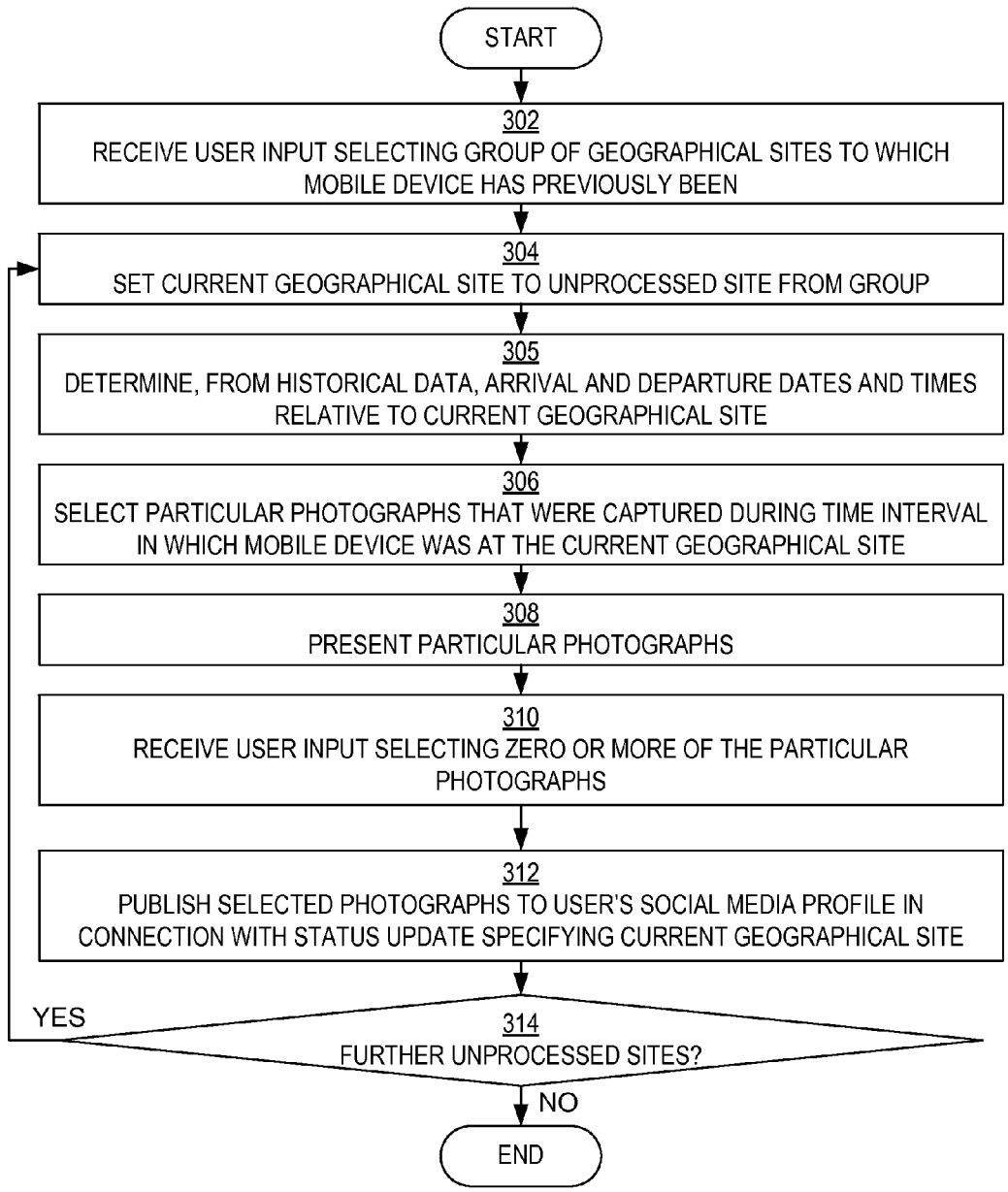
FIG. 3 is a flow diagram that illustrates a technique by which a mobile device can automatically associate media (e.g., photographs) stored on the mobile device with places that the mobile device previously visited, and by which the mobile device can publish that media on social media profiles in association with those places, according to an embodiment of the invention.

FIG. 3 is a flow diagram that illustrates a technique by which a mobile device can automatically associate media (e.g., photographs) stored on the mobile device with places that the mobile device previously visited, and by which the mobile device can publish that media on social media profiles in association with those places, according to an embodiment of the invention.

In block 302, the mobile device receives user input selecting a group of geographical sites to which the mobile device has previously been. For example, the mobile device can receive the user input as discussed above in connected with block 206 of FIG. 2 as part of retroactively checking in.

In block 304, the mobile device sets a current geographical site to be an as-of-yet-unprocessed site in the user-selected geographical site group. The mobile device proceeds to process the current geographical site according to the operations of blocks 305-312.

In block 305, the mobile device determines, from its historical record, a date and time of arrival and a date and time of departure from the current geographical site. For example, in one implementation, the mobile device maintains multiple entries regarding the device's location at historical dates and times. These entries can be clustered into groups based on spatial proximity and sorted temporally from earliest to latest. In one implementation, the first or earliest entry in such a cluster represents the date and time of arrival at the location to which the cluster corresponds. In one implementation, the last or latest entry in such a cluster represents the date and time of departure from the location to which the cluster corresponds. A site to which the mobile device has made multiple separate visits can be associated with multiple such clusters and multiple such arrivals and departures.

In block 306, the mobile device selects, from a set of photographs stored in the memory of the mobile device, particular photographs that were captured while the mobile device was at the current geographical site. In one embodiment, the mobile device can examine the metadata of each photograph stored in its memory to determine a date and time at which that photograph was captured. Each photograph having a capture date and time falling into the time interval at which the mobile device was at the current geographical site can be deemed to be associated with the current geographical site.

There are other ways in which the mobile device can select the particular photographs associated with the current geographical site. Typically, when a mobile device captures a photograph, the mobile device also stores metadata that indicates geographical coordinates or a geographical site. The mobile device associates this metadata with the photograph such that the metadata is embedded with the photograph's image data and travels with the photograph. Each photograph having metadata that specifies geographical coordinates that correspond to the current geographical site can be deemed to be associated with the current geographical site.

In block 308, the mobile device presents the particular photographs. For example, the mobile device can show tiled thumbnails of the particular photographs on a touch-sensitive display. The mobile device can also present text indicating that the particular photographs correspond to the current geographical site. The mobile device can additionally present text asking the user to choose which photographs he would like to publish to his social media profile(s).

In block 310, the mobile device receives user input selecting zero or more of the particular photographs. For example, the mobile device can detect that the user has touched zero or more of the particular photographs to select those photographs, followed by a user interface element instructing the mobile device to publish the selected photographs.

In block 312, in response to receiving the selection, the mobile device publishes, to the user's social media profile(s), the photographs selected (if any) in block 310. In one embodiment of the invention, the mobile device publishes the selected photographs on the profile(s) in connection with and visually proximate to a published check-in status that specifies the geographical site with which the selected photographs are associated, such that the publication indicates that those photographs are connected with that status rather than any other status on the profile. In one embodiment, publishing the photographs involves uploading the photographs over one or more networks, potentially including the Internet, to remote servers that are owned and operated by selected social media site(s) to which the user wants to check in.

In block 314, the mobile device determines whether the user-selected group of geographical sites selected in block 302 contains any further geographical site that has not yet been processed according to the operations of blocks 305-312. If so, then control passes back to block 304. Otherwise, the technique illustrated in FIG. 3 concludes.

Although the discussion above refers specifically to the publication of photographs that are associated with places to which a mobile device retroactively checks in (and the corresponding time intervals), alternative embodiments of the invention can involve the publication, to social media profiles, of media other than photographs. For example, in an embodiment, the mobile device can also automatically select, from a set of business reviews to which the mobile device has access, particular business reviews that pertain to businesses located in the vicinity of the places to which the mobile device is retroactively checking in. The mobile device can, with the user's permission, additionally or alternatively publish such particular business reviews along with other status information posted to a social media profile. For yet another example, in an embodiment, the mobile device also can automatically determine one or more other mobile devices that were in the vicinity of the selected places at the time to which the retroactive check-in pertains. The mobile device can make this determination based on communications transpiring between the devices during the time of the prior visit, for example, or based on other information indicating the locations of the other devices. Such other information can include postings gleaned from the social media profiles of the mobile device user's known social media friends and connections, for example. The mobile device can determine, for each such other mobile device, a social media friend who is associated with that device. Then, along with other status information that the mobile device posts to the social media profiles of its user, the mobile device can also, with its user's permission, publish identities of those social media friends in connection with that status information, thereby publicizing that those friends were with the user at the places to which the mobile device retroactively checked-in.

IV. Determining Visited Geographical Sites Based on Historical Patterns

As is discussed above, in one embodiment of the invention, a mobile device maintains a record of the geographical coordinates to which the mobile device has been. Such a record can span some specified time interval, reaching from the present moment back into the past. In one embodiment, the mobile device determines geographical sites of interest based on patterns in the record. For example, the mobile device can deduce, from analyzing the record, that the mobile device arrives at a particular geographical site at approximately a same time of day every day, or every weekday, or every specific day of the week (e.g., Friday), or every specific day of each month (e.g., the $1^{st}$). The mobile device can further deduce, from the record, that the mobile device departs from that particular geographical site with similar regularity. The mobile device can detect a pattern of remaining at a particular geographical site for approximately a same duration of time each time that the mobile device visits that particular geographical site. In one embodiment, the mobile device only marks a geographical site as being a site of interest if the durations of multiple prior visits to that site each exceed a specified minimum time threshold (e.g., 30 minutes). In one embodiment, the mobile device can conclude that a particular geographical site is a site of interest in response to detecting an occurrence of some event in association with the mobile device's arrival at that site. For example, such an event might involve the disconnection of the mobile device from a Bluetooth service, and/or the detected exiting of the mobile device from an automobile.

In one embodiment, the mobile device finds patterns of prior visits to particular geographical sites in this manner, and marks those particular geographical sites as being sites of interest. In one embodiment, the mobile device presents such sites of interest to a user in a manner more prominent than the mobile device presents other geographical sites that the mobile device previously visited. For example, in an embodiment, the mobile device may display sites of interest in a list before other geographical sites. For another example, in an embodiment, the mobile device may display only sites of interest to the user-so that the user can select sites of interest to which he wants to check in retroactively—without presenting any geographical sites that are not sites of interest.

In one embodiment, in response to a user's request, the mobile device presents a list of previously visited sites of interest. The mobile device can receive the user's selection of any particular site in the list. In response to receiving the user's selection, the mobile device can expand the selected site's list entry to show a list of sub-entries for that particular site. Each sub-entry can indicate a date and time of arrival and a date and time of departure from that particular site. Usually, a site of interest will be associated with multiple such sub-entries.

V. Hardware Overview

Figure 5A:
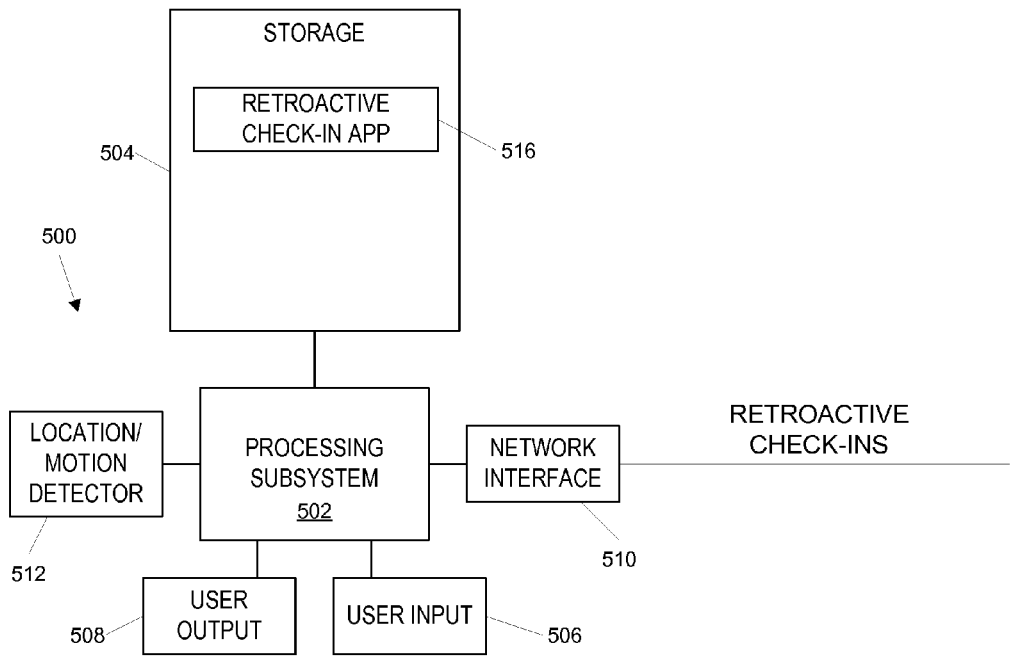
FIG. 5A is a simplified block diagram of an implementation of a mobile device according to an embodiment of the present invention.

FIG. 5A is a simplified block diagram of an implementation of a device 500 according to an embodiment of the present invention. Device 500 can be a mobile device, a handheld device, a notebook computer, a desktop computer, or any suitable electronic device with a screen for displaying images and that is capable of communicating with a social media server 550 as described herein. Device 500 includes a processing subsystem 502, a storage subsystem 504, a user input device 506, a user output device 508, a network interface 510, and a location/motion detector 512.

Processing subsystem 502, which can be implemented as one or more integrated circuits (e.g., e.g., one or more single-core or multi-core microprocessors or microcontrollers), can control the operation of device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage subsystem 504.

Through suitable programming, processing subsystem 502 can provide various functionality for device 500. For example, processing subsystem 502 can execute a retroactive check-in application program (or "app") 516. Retroactive check-in app 516 can automatically learn locations to which device 500 has previously been based on historical patterns of visits to those locations. Retroactive check-in app 516 can cause postings identifying those learned locations to be published to various social media sites. Retroactive check-in app 516 can perform various embodiments described herein.

Storage subsystem 504 can be implemented, e.g., using disk, flash memory, or any other storage media in any combination, and can include volatile and/or non-volatile storage as desired. In some embodiments, storage subsystem 504 can store one or more application programs to be executed by processing subsystem 502 (e.g., retroactive check-in app 516). In some embodiments, storage subsystem 504 can store other data (e.g., used by and/or defined by retroactive check-in app 516). Programs and/or data can be stored in non-volatile storage and copied in whole or in part to volatile working memory during program execution.

A user interface can be provided by one or more user input devices 506 and one or more user output devices 508. User input devices 506 can include a touch pad, touch screen, scroll wheel, click wheel, dial, button, switch, keypad, microphone, or the like. User output devices 508 can include a video screen, indicator lights, speakers, headphone jacks, or the like, together with supporting electronics (e.g., digital-to-analog or analog-to-digital converters, signal processors, or the like). A customer can operate input devices 506 to invoke the functionality of device 500 and can view and/or hear output from device 500 via output devices 508.

Network interface 510 can provide voice and/or data communication capability for device 500. For example, network interface 510 can provide device 500 with the capability of communicating with social media server 550. In some embodiments network interface 510 can include radio frequency (RF) transceiver components for accessing wireless voice and/or data networks (e.g., using cellular telephone technology, advanced data network technology such as 5G, 4G or EDGE, WiFi (IEEE 502.11 family standards, or other mobile communication technologies, or any combination thereof), and/or other components. In some embodiments network interface 510 can provide wired network connectivity (e.g., Ethernet) in addition to or instead of a wireless interface. Network interface 510 can be implemented using a combination of hardware (e.g., antennas, modulators/demodulators, encoders/decoders, and other analog and/or digital signal processing circuits) and software components.

Location/motion detector 512 can detect a past, current or future location of device 500 and/or a past, current or future motion of device 500. For example, location/motion detector 512 can detect a velocity or acceleration of mobile electronic device 500. Location/motion detector 512 can comprise a Global Positioning Satellite (GPS) receiver and/or an accelerometer. In some instances, processing subsystem 502 determines a motion characteristic of device 500 (e.g., velocity) based on data collected by location/motion detector 512. For example, a velocity can be estimated by determining a distance between two detected locations and dividing the distance by a time difference between the detections.

Figure 5B:
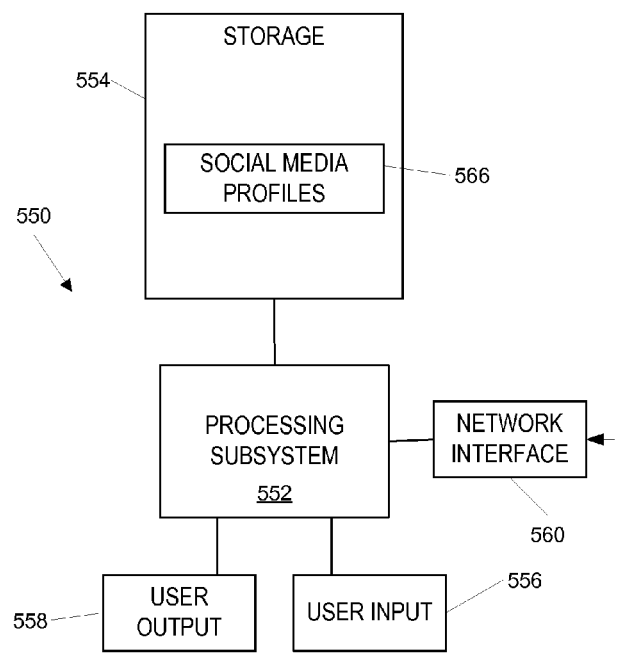
FIG. 5B is a simplified block diagram of an implementation of a social media server according to an embodiment of the present invention.

FIG. 5B is a simplified block diagram of an implementation of a social media server 550 according to an embodiment of the present invention. Social media server 550 may be used for any remote server mentioned herein. Social media server 550 includes a processing subsystem 552, storage subsystem 554, a user input device 556, a user output device 558, and a network interface 560. Network interface 560 can have similar or identical features as network interface 510 of device 500 described above.

Processing subsystem 552, which can be implemented as one or more integrated circuits (e.g., a conventional microprocessor or microcontroller), can control the operation of social media server 550. In various embodiments, processing subsystem 552 can execute a variety of programs in response to program code and can maintain multiple concurrently executing programs or processes. At any given time, some or all of the program code to be executed can be resident in processing subsystem 552 and/or in storage subsystem 554.

Through suitable programming, processing subsystem 552 can provide various functionality for social media server 550. Thus, social media server 550 can interact with retroactive check-in app 516 being executed on device 500 in order to receive location-specific status updates (retroactive check-ins) from device 500. In one embodiment, social media server 550 stores social media profiles for various areas, and updates those social media profiles based on data received from various users.

Storage subsystem 554 can be implemented, e.g., using disk, flash memory, or any other storage media in any combination, and can include volatile and/or non-volatile storage as desired. In some embodiments, storage subsystem 554 can store one or more application programs to be executed by processing subsystem 552. In some embodiments, storage subsystem 554 can store other data, such as social media profiles 566. Programs and/or data can be stored in non-volatile storage and copied in whole or in part to volatile working memory during program execution.

A user interface can be provided by one or more user input devices 556 and one or more user output devices 558. User input and output devices 556 and 558 can be similar or identical to user input and output devices 506 and 508 of device 500 described above. In some instances, user input and output devices 556 and 558 are configured to allow a programmer to interact with social media server 550. In some instances, social media server 550 can be implemented at a server farm, and the user interface need not be local to the servers.

It will be appreciated that device 500 and social media server 550 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 500 and/or multiple social media servers 550, different devices 500 and/or social media servers 550 can have different sets of capabilities; the various devices 500 and/or social media servers 550 can be but need not be similar or identical to each other.

Further, while device 500 and social media server 550 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 500 and social media server 550 are described as singular entities, it is to be understood that each can include multiple coupled entities. For example, social media server 550 can include, a server, a set of coupled servers, a computer and/or a set of coupled computers.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps.

Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method comprising:
during a time interval, tracking a plurality of locations to which a mobile device moves;
for each location of the plurality of locations, storing data that indicates the location;
after the time interval, displaying, on the mobile device, at least a subset of the plurality of locations based on the stored data;
receiving, at the mobile device, input selecting a particular location from the locations presented on the display;
determining one or more site names that are in a specified vicinity of the particular location; and
posting, to an Internet-based service accessible by a plurality of users, information pertaining to the particular location in response to receiving the input selecting the particular location, the information including a site name selected from the one or more site names.

2. The method of claim 1, further comprising:
receiving, at the mobile device, particular input instructing the mobile device to present locations at which the mobile device has previously been, wherein displaying the at least a subset of the plurality of locations is in response to receiving the particular input.

3. The method of claim 1, further comprising:
determining, at the mobile device, that the one or more site names are both (a) in the specified vicinity of the particular location and (b) subjects of one or more previous postings to the Internet-based service;
suggesting the one or more site names as identifiers for the particular location; and
in response to receiving input selecting a particular site name from the one or more site names, including the particular site name within the information posted to the Internet-based service.

4. The method of claim 1, further comprising:
determining, based on the stored data, a pattern of recurring visits to the particular location having shared temporal characteristics; and
selecting the particular location from the plurality of locations for presentation on the display in response to the determining of the pattern.

5. The method of claim 1, further comprising:
- determining, from the stored data, a date and time of arrival at the particular location;
- determining, from the stored data, a date and time of departure from the particular location;
- selecting, from a set of photographs, one or more photographs that are each associated with a capture date and time that occurs on or between (1) the date and time of arrival and (2) the date and time of departure;
- presenting representations of the one or more photographs on the display;
- receiving input that selects particular representations; and
- posting photographs corresponding to the particular representations to the Internet-based service in connection with the information pertaining to the particular location.

6. The method of claim 1, wherein presenting the subset of the plurality of locations based on the stored data comprises:
- organizing the plurality of locations into a plurality of geographical clusters; and
- presenting a separate representative location for each cluster of the plurality of geographical clusters.

7. The method of claim 1, further comprising:
- selecting, from a contact list stored in a memory of the mobile device, a contact name that is associated with an address that corresponds to the particular location;
- suggesting the contact name as an identifier for the particular location; and
- in response to receiving input selecting the contact name, including the contact name within the information posted to the Internet-based service.

8. The method of claim 1, wherein the one or more site names are determined prior to displaying the at least a subset of the plurality of locations.

9. The method of claim 1, wherein the one or more site names include one or more of a street address, a place name, a name of a point of interest, a contact name, a store name, a label indicating a home of a user, a label indicating a workplace of a user, a label indicating a school of a user, and a user-modified place name.

10. A non-transitory computer-readable storage medium storing instructions executable by one or more processors to cause the one or more processors to:
- track, during a time interval, a plurality of locations to which a mobile device moves;
- store, for each location of the plurality of locations, data that indicates the location and a time at which the mobile device was at the location;
- receive, at the mobile device, particular input instructing the mobile device to present locations at which the mobile device has previously been;
- display at least a subset of the plurality of locations based on the stored data in response to the particular input;
- receive, at the mobile device, input selecting a particular location from the locations displayed;
- determine one or more site names that are in a specified vicinity of the particular location; and
- post, to an Internet-based service accessible by a plurality of users, information pertaining to the particular location, the information including a site name selected from the one or more site names.

11. The non-transitory computer-readable storage medium of claim 10, wherein the instructions are executable by the one or more processors to cause the one or more processors to:
- determine, at the mobile device, that the one or more site names are both (a) in the specified vicinity of the particular location and (b) subjects of one or more previous postings to at least one social media profile of the one or more social media profiles;
- suggest the one or more site names as identifiers for the particular location; and
- include a site name selected from the one or more site names within the information posted to the one or more social media profiles.

12. The non-transitory computer-readable storage medium of claim 10, wherein the instructions are executable by the one or more processors to cause the one or more processors to:
- determine, based on the stored data, a pattern of recurring visits to the particular location having shared temporal characteristics; and
- select the particular location from the plurality of locations for presentation on the display in response to the determining of the pattern.

13. The non-transitory computer-readable storage medium of claim 10, wherein the instructions are executable by the one or more processors to cause the one or more processors to:
- determine, from the stored data, a date and time of arrival at the particular location;
- determine, from the stored data, a date and time of departure from the particular location;
- select, from a set of photographs, one or more photographs that are each associated with a capture date and time that occurs on or between (1) the date and time of arrival and (2) the date and time of departure;
- present representations of the one or more photographs on the display;
- receive input that selects particular representations; and
- post photographs corresponding to the particular representations to the one or more social media profiles in connection with the information pertaining to the particular location.

14. The non-transitory computer-readable storage medium of claim 10, wherein the instructions are executable by the one or more processors to cause the one or more processors to:
- organize the plurality of locations into a plurality of geographical clusters; and
- present a separate representative location for each cluster of the plurality of geographical clusters.

15. The non-transitory computer-readable storage medium of claim 10, wherein the instructions are executable by the one or more processors to cause the one or more processors to:
- select, from a contact list stored in a memory of the mobile device, a contact name that is associated with an address that corresponds to the particular location;
- suggest the contact name as an identifier for the particular location; and
- include a selected contact name within the information posted to the one or more social media profiles.

16. A mobile device comprising:
- one or more processors; and
- a memory storing instructions executable to cause the one or more processors to:
  - track a plurality of locations to which a mobile device travels;
  - store, for each location of the plurality of locations, data that indicates the location and a time at which the mobile device was at the location;

receive input selecting a particular location from the plurality locations while the mobile device is not at the particular location;

determine one or more site names that are in a specified vicinity of the particular location; and post, to one or more social media profiles, information identifying the particular location and indicating at least a time at which the mobile device was previously present at the particular location, the information including a site name selected from the one or more site names.

17. The mobile device of claim 16, wherein the instructions are executable by the one or more processors to cause the one or more processors to:

determine that the one or more site names are both (a) in the specified vicinity of the particular location and (b) subjects of one or more previous postings to at least one social media profile of the one or more social media profiles;

suggest the one or more site names as identifiers for the particular location; and include a site name selected from the one or more site names within the information posted to the one or more social media profiles.

18. The mobile device of claim 16, wherein the instructions are executable by the one or more processors to cause the one or more processors to:

determine, based on the stored data, a pattern of recurring visits to the particular location having shared temporal characteristics; and select the particular location from the plurality of locations for presentation on the display in response to the determining of the pattern.

19. The mobile device of claim 16, wherein the instructions are executable by the one or more processors to cause the one or more processors to:

determine, from the stored data, a date and time of arrival at the particular location;

determine, from the stored data, a date and time of departure from the particular location;

select, from a set of photographs, one or more photographs that are each associated with a capture date and time that occurs on or between (1) the date and time of arrival and (2) the date and time of departure;

present representations of the one or more photographs on the display;

receive input that selects particular representations; and post photographs corresponding to the particular representations to the one or more social media profiles in connection with the information pertaining to the particular location.

20. The mobile device of claim 16, wherein the instructions are executable by the one or more processors to cause the one or more processors to:

organize the plurality of locations into a plurality of geographical clusters; and present a separate representative location for each cluster of the plurality of geographical clusters.

21. The mobile device of claim 16, wherein the instructions are executable by the one or more processors to cause the one or more processors to:

select, from a contact list stored in the memory, a contact name that is associated with an address that corresponds to the particular location;

suggest the contact name as an identifier for the particular location; and include a selected contact name within the information posted to the one or more social media profiles.

22. The mobile device of claim 16, wherein the instructions are executable by the one or more processors to cause the one or more processors to:

receive particular input instructing the mobile device to present locations at which the mobile device has previously been;

present, in response to receipt of the particular input, on a display of the mobile device, at least a subset of the plurality of locations represented in the stored data.

* * * * *